United States Patent [19]

Pate

[11] Patent Number: 5,113,607
[45] Date of Patent: May 19, 1992

[54] SEGMENTAL FISHING LURE AND METHOD

[76] Inventor: Wallace F. Pate, P.O. Drawer 458, Georgetown, S.C. 29442

[21] Appl. No.: 456,527

[22] Filed: Dec. 26, 1989

[51] Int. Cl.⁵ ............................................. A01K 85/00
[52] U.S. Cl. .................... 43/42.28; 43/42.36; 43/42.09
[58] Field of Search ............ 43/42.26, 42.27, 42.28, 43/42.29, 42.3, 42.36, 42.09

[56] References Cited

U.S. PATENT DOCUMENTS

| | | | |
|---|---|---|---|
| 567,310 | 9/1896 | Gaide | 43/42.36 |
| 1,454,820 | 5/1923 | Readle | 43/42.28 |
| 1,688,110 | 10/1928 | Bogart | 43/42.29 |
| 2,140,724 | 12/1938 | Stefan | 43/54.1 |
| 2,237,534 | 4/1941 | Van Der Clute | 43/42.36 |
| 2,617,226 | 11/1952 | Yoshi | 43/42.28 |
| 3,740,889 | 6/1973 | Scott | 43/42.28 |

Primary Examiner—Richard K. Seidel
Assistant Examiner—James Miner
Attorney, Agent, or Firm—Clifton Ted Hunt

[57] ABSTRACT

A segmental fish lure has a core and a shell with at least one skirt assembly clamped between the core and the shell. The shell and the skirt assembly have passages large enough to pass over the loop of a leader to permit replacement of the shell and skirt assemblies without disturbing the leader.

7 Claims, 2 Drawing Sheets

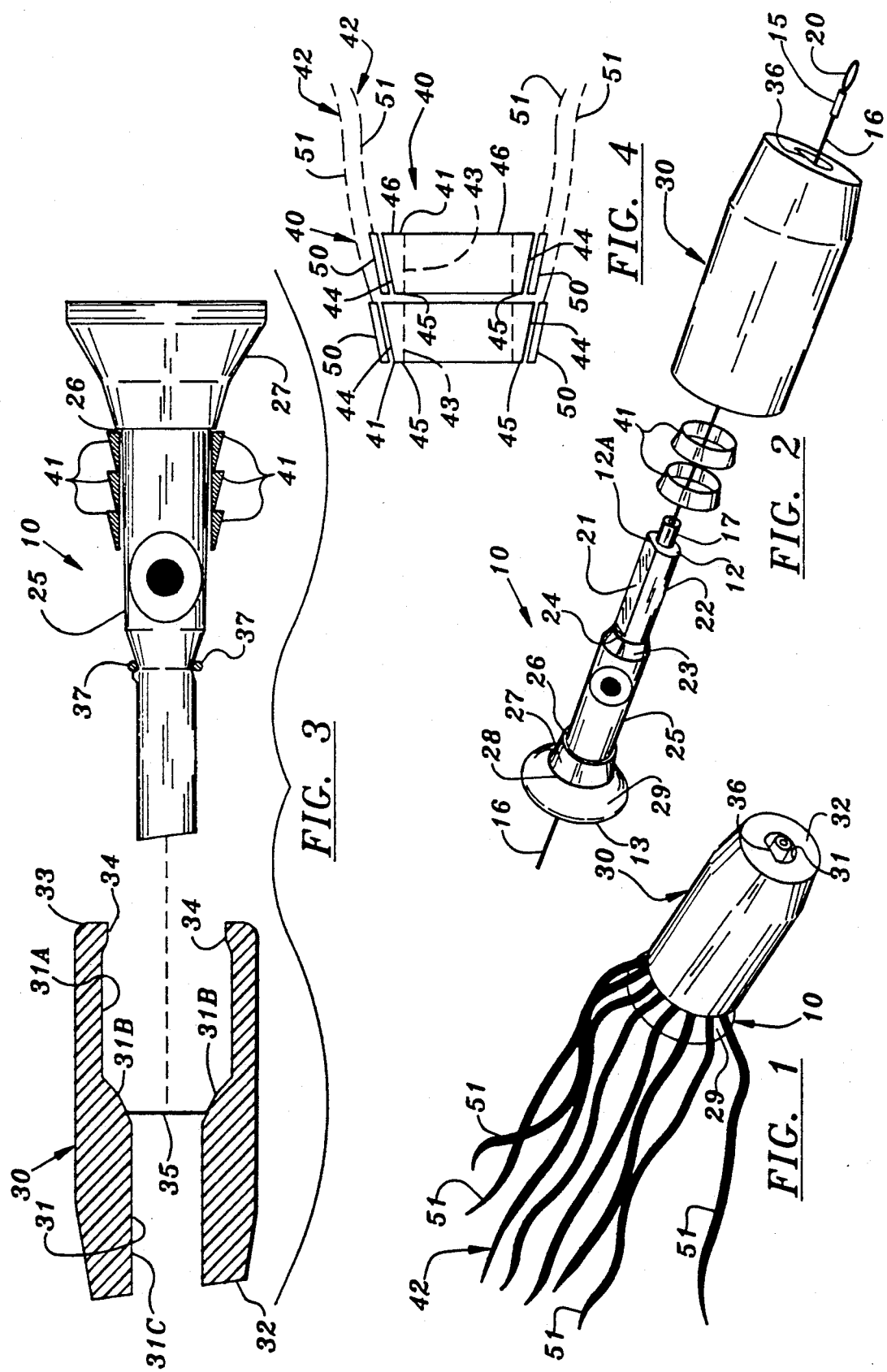

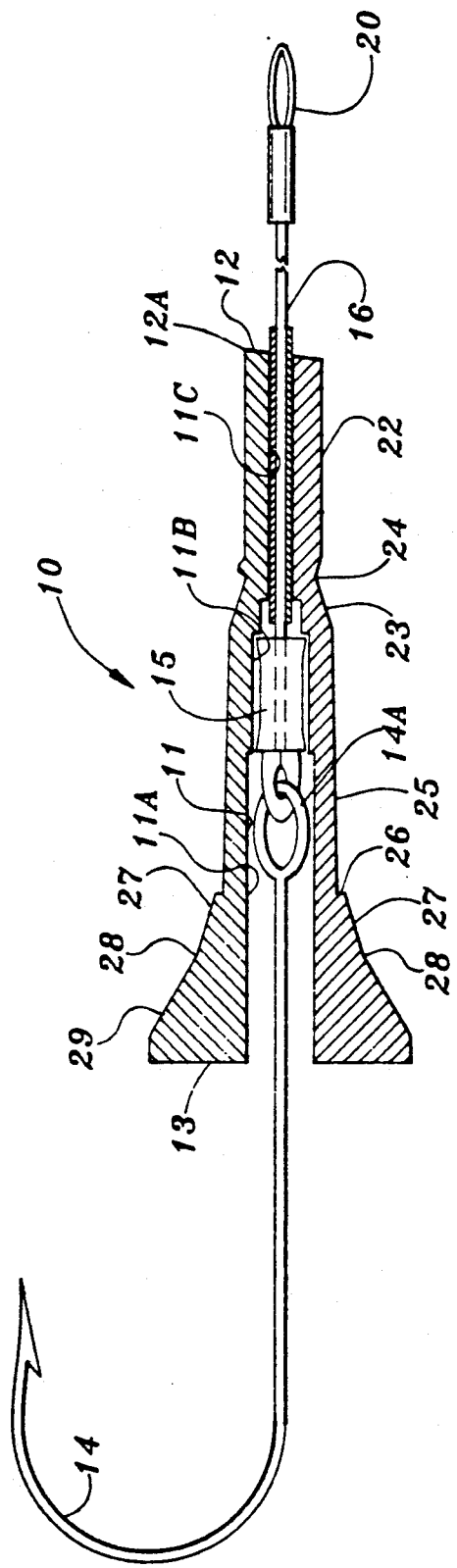
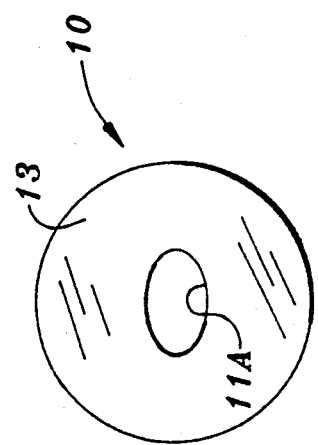
FIG. 5
FIG. 6

SEGMENTAL FISHING LURE AND METHOD

FIELD OF THE INVENTION

This invention relates to fishing lures having interchangeable parts and of the type often used in deep sea fishing for catching billfish and other pelogic species, and to the method of replacing the segments.

BACKGROUND OF THE INVENTION

Lures used for catching billfish and other game fish often have a rigid body with one or more permanently attached skirts surrounding the hook. These lures are made and used in a variety of configurations and colors and are provided with skirts of different sizes, configurations, and colors. The skirts are generally fastened to the body, as by wire, glue, tape, or otherwise, to define a one-piece lure, but it is known to provide a threaded connection between the skirt and the body of the lure. See U.S. Pat. No. 4,619,067 issued Oct. 28, 1986 to Robert A. West for FISHING LURE ASSEMBLY.

The disadvantage of the one-piece lures is that each one is "locked in" to its shape, color, weight, size, and the length and color of its skirt. During a typical fishing day, a fisherman may change lures many times, trying to find the lure that is just right for the prevailing light, sea condition, water color, water temperature, and available natural bait. These various conditions change throughout the day, and the fisherman using one-piece lures must have many lures in his tackle drawer, each pre-rigged with a leader and hooks. The rigging and storage of a sufficient variety of lures with their leaders and hooks is troublesome.

The screw-on skirt concept enables the use of a wide variety of skirts with a single lure body, but in order to change the skirt, the skirt must be removed by passing it over both hooks and off the rear of the lure. This requires manipulating the skirts rearward over the bend and barbs of the hooks to remove them, and reversing this cumbersome procedure to put different skirts on the lure. Each such change is time consuming and difficult in rough sea conditions.

U.S. Pat. No. 4,033,063 issued Jul. 5, 1977 to Norman W. Mize for FISH LURE represents the most pertinent patented art known to applicant. Mize shows a fish lure comprising a plug 18 fitted within a tubular body 10 having an axial opening therethrough of substantial diameter through which the loop on the leader of a hook assembly may be freely passed. Beads 22 hold the front 20a of an inner skirt 20 against the rear of plug 18 while the front 16a of an outer skirt 16 is held between the tapered inner surface 26 of the body 10 and the correspondingly tapered outer surface of the plug 18.

It appears the outer skirt 16 of Mize may be removed and replaced by releasing the leader from the snap fastener of a fishing line, not shown, sliding the skirt 16 over the loop at the end of the leader and off of the leader, and then threading a fresh skirt over the loop and on the leader before reconnecting the leader to the snap fastener. Mize's inner skirt 20 is not easily replaceable because the passage through it is too small to freely pass over the loop that is used to connect the leader to the snap fastener.

SUMMARY OF THE INVENTION

The fishing lure of the present invention comprises three parts, namely, (1) a core, (2) an outer shell, and (3) one or more skirt assemblies clamped between the core and the shell.

In use, the fisherman, or boat owner, will stock a supply of the shells in various shapes, sizes and colors, as well as a variety of the skirt assemblies with their skirts in varying lengths, material, and color. Only a few cores will be needed. They will be rigged with leaders and hooks to supply the available rods to be used, plus a few spares to replace lost rigs, frayed leaders, and the like.

The shells and skirts can be changed quickly and easily, as desired, without changing the core, with leader and hook assembly. The change is made by simply unfastening the loop at the leading end of the leader from the snap fastener at the end of the fishing line, sliding the shell and skirt assemblies forwardly on the leader to remove them from the core and then sliding the shell and skirt assemblies over the loop and removing them from the leader. The newly selected skirt assemblies and shell are then successively threaded on the leader and positioned on the core. The skirt assemblies and shell are held on the core by friction and pressure during use.

BRIEF DESCRIPTION OF THE DRAWINGS

FIG. 1 is a perspective view showing the shell, core, and skirt in assembled relation;

FIG. 2 is an exploded perspective view of the shell, core, and two skirt rings, the skirts being omitted for clarity of illustration;

FIG. 3 is an exploded view, showing a side elevation of the core with three skirt rings, shown in section, seated on the core and illustrating how the shell, shown in section, fits over the core;

FIG. 4 is an exploded side view of two skirt assemblies illustrating the abutting relation of the skirt rings in use, the dotted lines representing the skirt streamers;

FIG. 5 is a longitudinal sectional view of the assembled core and hook, showing the relative positions of the leader, hook, and crimped sleeves; and FIG. 6 is a rear view of the core showing the horizontally extending oblong shape of the cavity to receive and position the hook eye.

DETAILED DESCRIPTION OF THE INVENTION

The Core

Referring more specifically to the drawings, a core 10 is preferably formed from a rigid material, such as a suitable metal or plastic, in an elongated generally tubular configuration. A passage 11 extends longitudinally through the front wall 12 and rear wall 13 of the core. The rear or hook eye portion 11A of the passage 11 has an oblong cross sectional configuration which is large enough in its longest dimension to receive the eye 14A of a fish hook 14 attached by a crimped sleeve 15 to the rear end of a leader 16. The shortest dimension of the oblong hook eye portion 11A of the passage is narrow enough to prevent the fish hook from rotating within the core.

With the hook eye in the narrow portion 11A, the crimped sleeve 15 occupies a reduced medial portion 11B of the passage 11. The leader 16 extends forwardly from the crimped sleeve 15 through a further reduced forward portion 11C of the passage 11, which may be lined with an antifriction sleeve 17 formed of teflon, or the like. The forward end of the leader 16 is formed into a loop 20 secured by another crimped sleeve 15 for attachment to the usual snap fastener at the end of the fishing line, not shown.

The front end 12 of the core is illustrated in the drawings as being flat and inclined downwardly to orient the core with the leading edge 12A of the front wall 12 on top of the core as the core is drawn through the water in use. The purpose of this orientation is to fix the pointed end of the hook above the core in use for optimum hooking capability. However, if desired, the front end 12 may be rounded or flat or of any desired configuration without departing from the spirit of the invention.

The exterior of the core is generally circular with a flattened keyway 21 extending rearwardly along its forward portion 22 from the front wall 12 to a rearwardly inclined annular shoulder 23 extending radially outwardly from the core. An annular groove 24 extends about the core at the juncture of its forward portion 22 with the shoulder 23. A mid portion 25 of the core 10 is of larger diameter than its forward portion 21 and serves as a seat for one or more skirt assemblies which bear against a shoulder 26 extending perpendicularly outwardly from the core at the rear of the mid portion or seat 25.

The rear portion 27 of the circular core slopes outwardly at an angle behind the second shoulder 26 to a second annular groove 28 which circumscribes the core rearwardly of the shoulder 26. The rear portion then flares outwardly at a sharper angle, as indicated at 29, between the groove 28 and the rear wall 13 of the core.

The Shell

An elongated tubular shell 30 fits on the core 10. A satisfactory shell has been formed from a rigid transparent plastic but it is intended that the type and color of material will vary in use and is not critical to the satisfactory operation of the invention.

The shell 30 has a passage 31 extending longitudinally through its front and rear walls 32 and 33. The passage 31 is shaped and sized to generally conform with the exterior configuration of the core 10. More specifically, the passage 31 includes a rear portion 31A large enough to fit over the outwardly tapering rear portion 27 of the core and part of its enlarged rearmost portion 29. An inwardly directed annular rib 34 extends from the rear of the shell and overlies the annular groove 28 in the core when assembled.

The passage 31 slopes forwardly and inwardly, as at 31B in FIG. 3, from its rear portion 31A to an annular groove 35 which registers in assembled relation with the annular groove 24 in the core. A reduced portion 31C of the passage 31 extends forwardly from the annular groove 35 through the front wall 32 of the shell to overlie the forward portion 21 of the core when assembled. A flattened keyway 36 extends along the circular portion 31C of the passage 31 to register with the keyway 21 on the forward portion 22 of the core 10.

A resilient O-ring 37 is retained between the annular grooves 24 and 35 in the core and shell, respectively, to provide friction which helps to hold the core and shell together in use.

The front wall 32 of the shell 30 is shown to be flat and inclined at an angle to conform with the inclination of the front 12 of the core for the desired orientation of the fish lure in use, as explained above. However, if desired, the front of the core and shell may be rounded, pointed, perpendicular to the axis of the lure, or any desired configuration without departing from the spirit of the invention.

The Skirt Assemblies

One or more skirt assemblies 40 are removably clamped on the seat 25 of the core 10 by clamping the skirt(s) between the groove 28 around the rear portion of the core and the rib 34 at the rear of the shell 30. The skirts are preferably of different colors, different materials, and different lengths to be desirably intermixed on the same core by the user as often as desired with a minimum of effort and delay.

Each skirt assembly 40 comprises a novel skirt ring 41 and a filamentary skirt 42 of a suitable material, either or both of which may be molded from plastic of a conventional nature or otherwise as desired.

Each skirt ring 41 is formed from a hard metal or plastic with a passage 43 large enough to easily pass over the loop 20 at the end of the leader and fit on the mid portion or seat 25 of the core 10. The skirt rings 41 fit easily on the seat 25 in abutting relation to the shoulder 26, which limits their rearward movement.

The outer wall 44 of each skirt ring 41 tapers rearwardly and outwardly from its front wall 45. The taper is achieved by increasing the wall thickness from front to rear, resulting in a thinner wall thickness at the front 45 than at the rear wall 46 of the ring. The dimensions of the passage 43 and the tapered wall are uniform in all of the rings 41.

Referring to FIG. 4, each skirt 42 comprises a band 50 having a width corresponding to the distance between the front and rear walls 45 and 46, respectively, of a ring 41. The band 50 of the skirt is fastened to the ring 41 as by being formed integrally by molding, or by adhesive, or otherwise as desired. Skirt material, illustrated as a plurality of elongated filaments or streamers 51, extends rearwardly from that portion of the band 50 overlying the rear wall 46 of the ring 41. The outwardly inclined shape of the rings 41 positions the thickened rear wall 46 of a first ring outwardly beyond the thinner front wall 45 of a succeeding ring, thus allowing either of the skirt assemblies to fit in either the forward or rearward position.

The core 10 is shown in FIG. 3 with the rings 41 of three skirt assemblies 40 mounted for use on the mid portion or seat 25 of the core. The rings 41 bear against each other and the rearmost ring 41 bears against the shoulder 26 to limit rearward movement of the skirt assemblies in use.

The inner surface of the enlarge portion 31A of passage 31 in the shell 30 is spaced outwardly from the portions 25 and 26 of the core when assembled, and portions of the filamentary skirts 42 occupy that space between the core and the shell in use. The inwardly directed annular rib 34 at the rear of the shell bears against that portion of the skirts 42 that overlie the annular groove 28 between the portions 27 and 29 at the rear of the core. The resulting friction helps hold the shell and skirts in operative position on the core.

If desired, the rings 41 may be made and sold independently of the assembled bands 50 and streamers 51, leaving it to the user to customize the skirt assemblies by fastening the bands to the rings, as by adhesive.

There is thus provided a segmental fishing lure which may be easily and quickly taken apart and reassembled with segments of different colors and other characteristics desired by the user at the time.

Although specific terms have been employed in describing the invention, they have been used in a descriptive and generic sense only and not for the purpose of limitation, other than appears in the appended claims to invention.

I claim:

1. A fishing lure having a hook with a shank and an eye, a skirt assembly with a skirt surrounding the hook and a leader fastened at its rear end to the eye of the hook with the front end of the leader having a loop to be releasably attached to a fishing line for pulling the lure by a boat to catch fish, the improvement comprising a tubular core having a passage extending through its front and rear ends and sized for reception of the leader through the front of the passage and for the eye of the hook through the rear of the passage, the front of the core being larger than the loop on the front of the leader and the rear of the core being larger than the front of the core, the core including a medial portion of intermediate dimension providing a seat for the skirt assembly and the core having an annular groove between the front and medial portions of the core, said skirt assembly including a ring having an inner diameter corresponding to the diameter of the medial portion of the core and encircling the seat, a skirt extending rearwardly from the ring and beyond the hook, a tubular shell having a passage extending through the front and rear ends of the shell, the passage through the shell having an interior configuration corresponding to the exterior configuration of the core and the passage through the shell having an annular groove which registers with the annular groove in the core when the lure is assembled, an O-ring seated in the annular grooves, whereby the O-ring engages the core and the shell and provides frictional resistance to separation of the shell from the core in use, and the shell encircling the core in overlying and clamping relation to the skirt assembly, whereby the shell and the skirt assembly can be removed over the front end of the core and the skirt assembly replaced with another skirt assembly over the front end of the core without disturbing the core or the hook.

2. A fishing lure according to claim 1 wherein an annular rib extends inwardly at the rear of the shell and clamps the skirt against the enlarged rear end of the core when the lure is assembled, whereby the skirt engages the core and the shell and provides additional frictional resistance to separation of the shell from the core in use.

3. A segmental fishing lure for use with a leader having a loop at one end for releasable attachment to a snap fastener on a fishing line, said fishing lure comprising a core, a shell having a passage large enough to pass over the loop on the leader, a plurality of skirt assemblies, each skirt assembly including a preformed circular skirt ring having a passage large enough to pass over the loop on the leader, said plurality of skirt assemblies being releasably clamped in abutting relation to each other between the core and the shell, each skirt assembly comprising a skirt ring, a band, skirt material extending from the band, means fastening the band to the skirt ring, the passage through each of the skirt rings being of a uniform diameter and each skirt ring including a front wall and a rear wall, and said rear wall being thicker than the front wall, whereby the rear wall of a first skirt assembly extends above the thinner front wall of a succeeding skirt assembly.

4. A fishing lure according to claim 3 wherein the configuration of the passage through the shell at least partially conforms to the exterior configuration of the core, the core at least partially fits within the shell, and means frictionally retaining the shell on the core during use.

5. A segmental fishing lure for use with a leader having a loop at one end for releasable attachment to a snap fastener on a fishing line, said fishing lure comprising a core, a shell having a passage large enough to pass over the loop on the leader, a plurality of skirt assemblies, each skirt assembly comprising a skirt ring, a band, skirt material extending from the band, means fastening the band to the skirt ring, the skirt rings in the skirt assemblies having passages of a uniform diameter large enough to pass over the loop on the leader, each skirt ring including a front wall and a rear wall, said rear wall being thicker than the front wall, whereby the rear wall of a first skirt assembly extends above the thinner front wall of a succeeding skirt assembly, means for releasably clamping the skirt assemblies between the core and the shell, whereby the shell and the skirt assemblies can be removed from the core and from the leader and replaced by disconnecting the leader from the fishing line without otherwise disturbing the leader or the core.

6. A fishing lure for use with a leader having a loop at one end for releasable attachment to a snap fastener on a fishing line, said fishing lure comprising a core, an annular shoulder encircling a portion of the core, a shell having a passage large enough to encircle the shouldered portion of the core and to pass over the loop on the leader, a plurality of skirt assemblies mounted on the core, each skirt assembly including a preformed circular skirt ring having a passage large enough to seat on the shouldered portion of the core and to pass over the loop on the leader and a plurality of filaments extending beyond the skirt ring of each skirt assembly, the filaments of each skirt assembly being of a different color than the filaments of other skirt assemblies on the lure and intermingling with the filaments of another skirt assembly in use, wherein the passage through each of the skirt rings is of uniform diameter and each skirt ring includes a front wall and a rear wall, and said rear wall being thicker than the front wall, wherein the rear wall of a first skirt assembly is adjacent the thinner front wall of a succeeding skirt assembly, whereby the visual attractiveness of the lure is enhanced and the leader can be removed from the fishing line and the shell and the plurality of skirt assemblies can then be removed from the core and from the leader and then the removed skirt assemblies replaced with a plurality of additional skirt assemblies comprising skirt rings and of selected colors by threading the additional skirt assemblies over the leader and then seating the skirt rings of the additional skirt assemblies on the shouldered portion of the core and then threading the shell over the leader and on the core in encircling relation to the skirt rings seated on the shouldered portion of the core, and the leader reattached to the fishing line without otherwise disturbing the core or the leader.

7. A method of removing and replacing a plurality of skirt assemblies on a fishing lure attached to a leader on a fishing line, said method comprising the steps of:
   (a) providing a core having a passage to freely receive the leader,
   (b) providing a shell having a passage large enough to pass over the leader forwardly of the core and seat in clamping relation on the core, (c) providing a plurality of skirt assemblies,
(d) each skirt assembly including
  (i) a preformed circular skirt ring having a passage large enough to pass over the leader forwardly of the core and seat on the core,
  (ii) a plurality of filaments extending beyond the skirt ring of each skirt assembly, and
  (iii) the filaments of each skirt assembly being of a different color than the filaments of another skirt assembly on the lure and intermingling with the filaments of another skirt assembly in use,
(e) loosening the leader from the fishing line,
(f) passing the skirt rings of a first group of skirt assemblies with filaments of selected colors and the shell over the loosened end of the leader, over the front of the core and on the core in encircling relation to the core,
(g) connecting the leader to the fishing line and fishing until it is desired to change the color of the skirt filaments,
(h) loosening the leader from the fishing line,
(i) passing the first group of skirt assemblies and the shell over the front end of the core and over the loosened end of the leader,
(j) passing the skirt rings of a second group of skirt assemblies with filaments of different colors and the shell over the loosened end of the leader, over the front of the core and on the core in encircling and clamping relation to the core, and
(k) connecting the leader to the fishing line for fishing.

* * * * *